US008357737B2

(12) United States Patent
Tanaka et al.

(10) Patent No.: US 8,357,737 B2
(45) Date of Patent: Jan. 22, 2013

(54) POLYARYLENE SULFIDE COMPOSITION

(75) Inventors: Yasumi Tanaka, Mie (JP); Toshihiko Muneto, Mie (JP)

(73) Assignee: Tosoh Corporation, Shunan-shi (JP)

( * ) Notice: Subject to any disclaimer, the term of this patent is extended or adjusted under 35 U.S.C. 154(b) by 0 days.

(21) Appl. No.: 11/997,921

(22) PCT Filed: Nov. 1, 2006

(86) PCT No.: PCT/JP2006/321914
§ 371 (c)(1),
(2), (4) Date: Feb. 5, 2008

(87) PCT Pub. No.: WO2007/052727
PCT Pub. Date: May 10, 2007

(65) Prior Publication Data
US 2009/0043026 A1    Feb. 12, 2009

(30) Foreign Application Priority Data

Nov. 4, 2005  (JP) .................................. 2005-320716
Apr. 6, 2006  (JP) .................................. 2006-105219

(51) Int. Cl.
*C08L 91/06* (2006.01)
(52) U.S. Cl. ......................... 524/277; 524/442; 524/404
(58) Field of Classification Search .................. 524/227
See application file for complete search history.

(56) References Cited

U.S. PATENT DOCUMENTS

| 5,049,446 A * | 9/1991 | Blackwell et al. ............ 428/364 |
| 6,685,855 B1 * | 2/2004 | Miller et al. .................... 264/1.1 |
| 6,706,206 B1 | 3/2004 | Aichele et al. |
| 6,995,205 B2 * | 2/2006 | Matsukawa et al. .......... 524/439 |
| 2001/0004546 A1 | 6/2001 | Tobita et al. |
| 2002/0111415 A1 * | 8/2002 | Mack et al. .................... 524/496 |
| 2003/0171487 A1 * | 9/2003 | Ellsworth et al. ............. 524/588 |
| 2004/0152831 A1 * | 8/2004 | Okuyama ..................... 524/609 |
| 2006/0286295 A1 | 12/2006 | Kiyokawa et al. |
| 2007/0158617 A1 | 7/2007 | Greiner et al. |

FOREIGN PATENT DOCUMENTS

| CN | 1556837 A | 12/2004 |
| EP | 0 942 436 | 9/1999 |
| JP | 1-282264 | 11/1989 |
| JP | 2 272063 | 11/1990 |
| JP | 4 33958 | 2/1992 |
| JP | 10 60277 | 3/1998 |
| JP | 11-329074 | 11/1999 |
| JP | 2001-172398 | 6/2001 |
| JP | 2002 129015 | 5/2002 |
| JP | 2003-34522 | * 2/2003 |
| JP | 2003-268236 | 9/2003 |
| JP | 2004 137401 | 5/2004 |
| JP | 2005-68187 | * 3/2005 |
| JP | 2005 162918 | 6/2005 |
| JP | 2005-169830 | 6/2005 |
| JP | 2006-328155 | 12/2006 |
| JP | 2007-45988 | 2/2007 |
| JP | 2007-51270 | 3/2007 |
| JP | 2007-70587 | 3/2007 |
| WO | 03 029352 | 4/2003 |
| WO | WO/03/029352 | 4/2003 |
| WO | WO 03/029352 | * 4/2003 |
| WO | WO 03/078527 | 9/2003 |
| WO | WO 2005/033215 | 4/2005 |
| WO | WO 2005/033216 | 4/2005 |
| WO | WO 2005/057590 | 6/2005 |

OTHER PUBLICATIONS

JP 2005-68187, Muento, machine translation.*
JP 2003-34522, Kiyokawa, machine translation.*
Notification of Reasons for Refusal mailed on Sep. 14, 2010, in Japanese Patent Application No. 2006-105219, filed on Apr. 6, 2006.
Office Action issued Feb. 13, 2012 in Korean Patent Application No. 10-2008-7007703 (with English translation).

* cited by examiner

*Primary Examiner* — Doris Lee
(74) *Attorney, Agent, or Firm* — Oblon, Spivak, McClelland, Maier & Neustadt, L.L.P.

(57) ABSTRACT

The object of the present invention is to provide a polyarylene sulfide composition having excellent thermal conductivity, dimensional stability, heat resistance and low gas property, which is particularly useful to applications of electric parts such as electric and/or electronic parts or automobile electric parts. The present invention relates to a polyarylene sulfide composition comprising a polyarylene sulfide (a), a metal silicon powder (b), a fibrous filler (c), and preferably a release agent (d) and at least one thermally conductive filler (e) selected from the group consisting of a scale-like boron nitride powder (e1) having a hexagonal structure, a coated magnesium oxide powder (e2) coated with a complex oxide of silicon and magnesium and/or a complex oxide of aluminum and magnesium, a high purity magnesite powder (e3) which is a magnesite comprising magnesium carbonate as a main component and has a magnesium carbonate content of from 98 to 99.999% by weight, and graphite (e4).

18 Claims, No Drawings

POLYARYLENE SULFIDE COMPOSITION

TECHNICAL FIELD

The present invention relates to a polyarylene sulfide composition having excellent thermal conductivity, dimensional stability, heat resistance and mechanical properties, and having low gas generation amount when melting (hereinafter referred to as low gas property). More particularly, it relates to a polyarylene sulfide composition particularly useful to applications of electric parts such as electric and/or electronic parts or automobile electric parts.

BACKGROUND ART

A polyarylene sulfide is a resin showing excellent properties in heat resistance, chemical resistance, moldability and the like, and utilizing its excellent properties, it is widely used in electric and/or electronic equipment members, automobile equipment members, OA equipment members and the like.

However, the polyarylene sulfide has low thermal conductivity. Therefore, for example, where electronic parts involving heat generation is encapsulated with the polyarylene sulfide, heat generated cannot efficiently be diffused, and as a result, this often has given rise to the problems such as dimensional change due to thermal expansion, deformation due to heat and gas generation.

Some investigations have hitherto been made on the attempt to improve thermal conductivity of the polyarylene sulfide. For example, a resin composition comprising (a) a polyphenylene sulfide, (b) an alumina powder having an average particle diameter of 5 μm or less and (c) a fibrous reinforcement is proposed (for example, see Patent Document 1). Further, a resin composition comprising (a) a polyarylene sulfide, (b) a carbon fiber having specific modulus of elongation and (c) at least one filler selected from graphite, a metal powder, alumina, magnesia, titania, dolomite, boron nitride and aluminum nitride is proposed (for example, see Patent Document 2). Further, a resin composition comprising (a) a resin comprising a polyphenylene sulfide and a polyphenylene ether, (b) a carbon fiber having specific coefficient of thermal conductivity and (c) graphite is proposed (for example, see Patent Document 3).

Patent Document 1: JP-A-04-033958
Patent Document 2: JP-A-2002-129015
Patent Document 3: JP-A-2004-137401

DISCLOSURE OF THE INVENTION

Problems that the Invention is to Solve

However, in the methods proposed in Patent Documents 1 to 3, thermal conductivity of the composition is low, and additionally, the composition has anisotropic thermal conductivity, and further has large thermal expansion. As a result, sufficient dimensional stability was not obtained. Further, to obtain sufficiently high thermal conductivity in those proposed methods, high filler content is essential, and due to this, decrease in mechanical strength of the composition is remarkable, resulting in deterioration of mold releasability and appearance of a molding. That is, those proposed methods were largely difficult to simultaneously obtain high thermal conductivity, high mechanical strength, good mold releasability and good appearance of a molding.

Accordingly, the present invention has an object to provide a polyarylene sulfide composition having excellent thermal conductivity, dimensional stability, heat resistance, mechanical strength and low gas property. More particularly, it provides a polyarylene sulfide composition particularly useful to applications of electric parts such as electric and/or electronic parts or automobile electric parts.

Means for Solving the Problems

As a result of keen investigations to solve the above problems, the present inventors have found that a polyarylene sulfide composition comprising a polyarylene sulfide, a metal silicon powder and a fibrous filler can be a composition having high thermal conductivity and additionally having excellent mechanical strength, and have reached to complete the present invention.

That is, the present invention relates to a polyarylene sulfide composition comprising (a) a polyarylene sulfide, (b) a metal silicon powder and (c) a fibrous filler.

Advantage of the Invention

The present invention provides a polyarylene sulfide composition having excellent thermal conductivity, dimensional stability, heat resistance and low gas property, and the polyarylene sulfide composition is particularly useful to applications of electric parts such as electric and/or electronic parts or automobile electric parts.

BEST MODE FOR CARRYING OUT THE INVENTION

The present invention is described in detail below.

The polyarylene sulfide composition of the present invention comprises (a) a polyarylene sulfide, (b) a metal silicon powder and (c) a fibrous filler.

As the polyarylene sulfide (a) constituting the polyarylene sulfide composition of the present invention, any polyarylene sulfides can be used so far as those belong to the category called a polyarylene sulfide. Of those, from that a polyarylene sulfide composition obtained has excellent mechanical strength and molding processability, a polyarylene sulfide having a melt viscosity of from 50 to 3,000 poise measured with a Koka type flow tester using a die having a diameter of 1 mm and a length of 2 mm under the conditions of a measurement temperature of 315° C. and a load of 10 kg is preferable, and a polyarylene sulfide having a melt viscosity of from 60 to 1,500 poise is particularly preferable.

Further, the polyarylene sulfide (a) containing 70 mol % or more, and particularly 90 mol % or more, of a p-phenylene sulfide unit represented by the following general formula (1) as its constituent unit is preferable.

[Chem. 1]

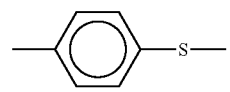
(1)

The polyarylene sulfide (a) may further contain other constituent components such as a m-phenylene sulfide unit represented by the following general formula (2),

[Chem. 2]

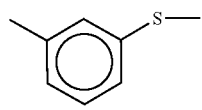
(2)

an o-phenylene sulfide unit represented by the general formula (3),

[Chem. 3]

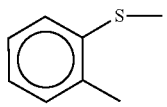
(3)

a phenylene sulfide sulfone unit represented by the general formula (4),

[Chem. 4]

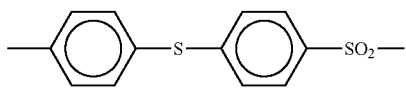
(4)

a phenylene sulfide ketone unit represented by the general formula (5),

[Chem. 5]

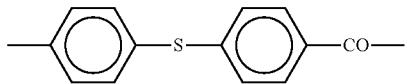
(5)

a phenylene sulfide ether unit represented by the general formula (6),

[Chem. 6]

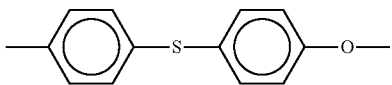
(6)

a biphenyl sulfide unit represented by the general formula (7),

[Chem 7.]

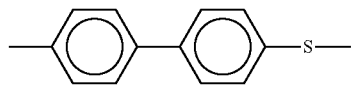
(7)

a substituent-containing phenylene sulfide unit represented by the general formula (8),

[Chem. 8]

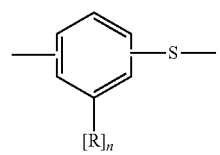
(8)

(where, R represents OH, $NH_2$, COOH or $CH_3$, and n is 1 or 2), and a branched structure-containing phenylene sulfide unit represented by the general formula (9).

[Chem. 9]

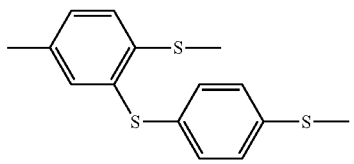
(9)

Above all, a poly(p-phenylene sulfide) is preferable.

A production method of the polyarylene sulfide (a) is not particularly limited. For example, the polyarylene sulfide (a) can be produced by the generally known method of reacting an alkali metal sulfide and a dihalo aromatic compound in a polymerization solvent. Examples of the alkali metal sulfide include lithium sulfide, sodium sulfide, potassium sulfide, rubidium sulfide, cesium sulfide and their mixtures. Those may be used in a form of a hydrate. Those alkali metal sulfides are obtained by reacting an alkali metal hydrosulfide and an alkali metal base, and may be prepared in situ prior to the addition of the dihalo aromatic compound to a polymerization system, or may use one prepared outside the system. Examples of the dihalo aromatic compound include p-dichlorobenzene, p-dibromobenzene, p-diiodobenzene, m-dichlorobenzene, m-dibromobenzene, m-diiodobenzene, 1-chloro-4-bromobenzene, 4,4'-dichlorodiphenylsulfone, 4,4'-dichlorodiphenyl ether, 4,4'-dichlorobenzophenone and 4,4'-dichlorodiphenyl. The ratio of the alkali metal sulfide and the dihalo aromatic compound charged is preferably in a range of alkali metal sulfide/dihalo aromatic compound (molar ratio)= 1/0.9 to 1.1.

The polymerization solvent is preferably a polar solvent, and is particularly preferably an organic amide which is aprotic and is stable to an alkali at high temperature. Examples of the organic amide include N,N-dimethylacetamide, N,N-dimethylformamide, hexamethyl-phosphoramide, N-methyl-ε-caprolactam, N-ethyl-2-pyrrolidone, N-methyl-2-pyrrolidone, 1,3-dimethyl-imidazolidinone, dimethylsulfoxide, sulfolane, tetra-methylurea and their mixtures. The polymerization solvent is used in a range of preferably from 150 to 3,500% by weight, and particularly preferably from 250 to 1,500% by weight, to the polymer formed by the polymerization. The polymerization is preferably conducted at from 200 to 300° C., and particularly from 220 to 280° C., for from 0.5 to 30 hours, and particularly from 1 to 15 hours, under stirring.

The polyarylene sulfide (a) may be a straight-chain compound, a compound having been subjected to treatment at high temperature in the presence of oxygen to crosslink, a compound having some amount of a crosslinked or branched structure introduced therein by adding a small amount of a trihalo or more polyhalo compound, a compound having been subjected to heat treatment in a non-oxidizing inert gas such as nitrogen, or a mixture of those structures.

The addition amount of the polyarylene sulfide (a) constituting the polyarylene sulfide composition of the present invention is preferably from 15 to 50% by weight for the reason that a polyarylene sulfide composition having particularly excellent mechanical strength, moldability and thermal conductivity is obtained.

The metal silicon powder (b) constituting the polyarylene sulfide composition of the present invention is a conventionally known and commercially available metal silicon powder, and any powder can be used so far as it belongs to this category. The silicon content in the metal silicon powder (b) is not particularly limitative. The silicon content is preferably 95% by weight or more, and more preferably 98% by weight or more, for the reason that a polyarylene sulfide composition having particularly excellent thermal conductivity is obtained. The metal silicon powder (b) preferably has an average particle diameter ($D_{50}$) measured with a laser diffraction scattering method of 1 μm or more for the reason that a polyarylene sulfide composition having particularly excellent mechanical properties and thermal conductivity is obtained.

The shape of the metal silicon powder (b) is not particularly limited, and examples of the shaped powder include a dendritic powder, a flaky powder, an angular powder, a spherical powder, a granular powder, a needle powder, an amorphous powder and a spongy powder. Further, the metal silicon powder (b) may be mixtures of those shaped powders. Examples of the production method of the metal silicon powder (b) include an electrolysis method, a mechanical grinding method, an atomizing method, a heat treatment method and a chemical production method, but the production method is not limited to those methods.

The addition amount of the metal silicon powder (b) constituting the polyarylene sulfide composition of the present invention is preferably from 15 to 60% by weight for the reason that a polyarylene sulfide composition having particularly excellent mechanical strength, moldability and thermal conductivity is obtained.

The fibrous filler (c) constituting the polyarylene sulfide composition of the present invention imparts mechanical strength to the polyarylene sulfide composition. Examples of the fibrous filler (c) that can be used include a glass fiber, a carbon fiber, an aramide fiber, a boron fiber, an alumina fiber, a potassium titanate whisker, an aluminum borate whisker and a zinc oxide whisker that are generally known as a fibrous filler. Of those, a carbon fiber (c1) having high thermal conductivity having a coefficient of thermal conductivity of 100 W/m·K or more (hereinafter simply referred to as a "high thermally conductive carbon fiber (c1)") is preferable for the reason that a polyarylene sulfide composition having particularly excellent thermal conductivity is obtained. Examples of the shape of the fibrous filler (c) include a chopped fiber having a fiber diameter of from 3 to 20 μm and a fiber length of from 2 to 8 mm, and a milled fiber having a fiber diameter of from 3 to 20 μm and a fiber length of from 30 to 900 μm. Of those, the chopped fiber is preferable for the reason that a polyarylene sulfide composition having particularly excellent mechanical strength is obtained.

As the high thermally conductive carbon fiber (c1), any carbon fibers can be used without any limitation so far as it is satisfied with the requirement of a carbon fiber having a coefficient of thermal conductivity of 100 W/m·K or more. Carbon fibers are roughly classified into a polyacrylonitrile type, a pitch type, a rayon type, a polyvinyl alcohol type, and the like, and any of those can be used so far as it has a coefficient of thermal conductivity of 100 W/m·K or more. A pitch type carbon fiber is preferable. Examples of the shape of the high thermally conductive carbon fiber (c1) include a chopped fiber having a fiber diameter of from 5 to 20 μm and a fiber length of from 2 to 8 mm, and a milled fiber having a fiber diameter of from 5 to 20 μm and a fiber length of from 30 to 600 μm. Of those, the chopped fiber is preferable for the reason that a polyarylene sulfide composition having particularly excellent mechanical strength is obtained.

The addition amount of the fibrous filler (c) constituting the polyarylene sulfide composition of the present invention is preferably from 5 to 60% by weight for the reason that a polyarylene sulfide composition having particularly excellent mechanical strength and moldability is obtained.

The polyarylene sulfide composition of the present invention preferably further contains a release agent (d) for the reason that it enables a polyarylene sulfide composition to have excellent releasability from a mold when molding processing, and therefore to provide a product having excellent production efficiency and appearance. As the release agent (d), release agents that are generally known as a release agent of a polyarylene sulfide can be used, and examples thereof include a carnauba wax (d1), a polyethylene wax (d2), a polypropylene wax (d3), a metal stearate (d4) and an acid amide wax (d5). Of those, the carnauba wax (d1) is preferable for the reason that it has excellent mold releasability when molding and processing the polyarylene sulfide composition into a molding, and excellent effect for improving appearance of a product.

The addition amount of the release agent (d), preferably the carnauba wax (d1), is preferably from 0.05 to 5% by weight for the reason that a polyarylene sulfide composition having excellent mold releasability and appearance of a molding is obtained without mold contamination or the like when molding processing.

The polyarylene sulfide composition of the present invention preferably further contains at least one thermally conductive filler (e) selected from the group consisting of a scale-like boron nitride powder (e1) having a hexagonal structure (hereinafter simply referred to as a "scale-like boron nitride powder (e1)"), a coated magnesium oxide powder (e2) coated with a complex oxide of silicon and magnesium and/or a complex oxide of aluminum and magnesium (hereinafter simply referred to as a "coated magnesium oxide powder (e2)"), a high purity magnesite powder (e3) which is a magnesite comprising magnesium carbonate as a main component and has a magnesium carbonate content of from 98 to 99.999% by weight (hereinafter simply referred to as a "high purity magnesite powder (e3)"), and graphite (e4) for the reason that the resulting polyarylene sulfide composition has further excellent heat conductivity and mechanical properties, and additionally have small anisotropy in coefficient of thermal conductivity and coefficient of thermal expansion.

The scale-like boron nitride powder (e1) selected as the thermally conductive filler (e) has a hexagonal structure and any filler can be used so far as it is satisfied with this requirement. The scale-like boron nitride powder (e1) can be produced by, for example, heat treating a crude boron nitride powder at 2,000° C. for 3 to 7 hours in a nitrogen atmosphere in the presence of a borate of an alkali metal or an alkaline earth metal to sufficiently develop boron nitride crystals, grinding the same, and according to need, purifying the resulting powder with a strong acid such as nitric acid. The boron nitride powder thus obtained generally has a scale-like shape. The scale-like boron nitride powder (e1) preferably has an average particle diameter ($D_{50}$) measured with a laser diffraction scattering method of from 3 to 30 μm for the reason that it has excellent dispersibility in the polyarylene sulfide composition of the present invention, thereby obtaining a polyarylene sulfide composition having excellent mechanical properties. Further, the scale-like boron nitride powder (e1) shows high crystallizability and preferably has G.I. value (G.I=$[I_{(100)+(101)}]/[I_{(102)}]$) shown by a ratio of the sum $[I_{(100)+(101)}]$ of integral intensity values of (100) diffraction line and (101) diffraction line to an integral intensity value $[I_{(102)}]$ of (102) diffraction line, measured with a powder X-ray diffraction method, in a range of from 0.8 to 10 for the reason that a polyarylene sulfide composition having particularly excellent thermal conductivity can be obtained.

The coated magnesium oxide powder (e2) selected as the thermally conductive filler (e) is a coated magnesium oxide powder coated with a complex oxide of silicon and magnesium and/or a complex oxide of aluminum and magnesium, and any powder can be used so far as it belongs to the category of the coated magnesium oxide powder (e2). For example, the coated magnesium oxide powder (e2) can be obtained by the method described in JP-A-2004-027177. The complex oxide of silicon and magnesium is a metal oxide containing silicon, magnesium and oxygen, represented by, for example, forsterite ($Mg_2SiO_4$), or a composite of magnesium oxide and silicon oxide. On the other hand, the complex oxide of aluminum and magnesium is a metal oxide containing aluminum, magnesium and oxygen, represented by, for example, spinel ($Al_2MgO_4$), or a composite of magnesium oxide and aluminum oxide. The coated magnesium oxide powder (e2) may further be surface treated with a silane coupling agent, a titanate coupling agent or an aluminate coupling agent according to need. Examples of the silane coupling agent include vinyl triethoxysilane, γ-methacryloxypropyl trimethoxysilane, γ-aminopropyl trimethoxysilane, γ-glycidoxypropyl trimethoxysilane and γ-mercaptopropyl trimethoxysilane. Example of the titanate coupling agent includes isopropyl triisostearoyl titanate. Example of the aluminate coupling agent includes acetoalkoxyaluminum diisopropylate. The coated magnesium oxide powder (e2) has an average particle diameter ($D_{50}$) measured with a laser diffraction scattering method of preferably from 1 to 500 μm, and particularly preferably from 3 to 100 μm, for the reason that a polyarylene sulfide composition having particularly excellent mechanical properties and thermal conductivity is obtained.

The high purity magnesite powder (e3) selected as the thermally conductive filler (e) is magnesite comprising magnesium carbonate as a main component and is a high purity magnesite powder having the magnesium carbonate content of from 98 to 99.999% by weight. Any high purity magnesite powder can be used without any limitation so far as it is satisfied with the requirement. The high purity magnesite powder (e3) includes a synthetic product and a natural product, and any of those may be used. Preferable example of the high purity magnesite powder (e3) includes Synthetic Magnesite MSHP (trade name, a product of Konoshima Chemical Co., Ltd.). The high purity magnesite power has an average particle diameter ($D_{50}$) measured with a laser diffraction scattering method of preferably 1 μm or more, and particularly preferably 10 μm or more, for the reason that a polyarylene sulfide composition having particularly excellent thermal conductivity is obtained. The high purity magnesite powder (e3) may further be surface treated with a silane coupling agent, a titanate coupling agent or an aluminate coupling agent according to need. Examples of the silane coupling agent include vinyl triethoxysilane, γ-methacryloxypropyl trimethoxysilane, γ-aminopropyl trimethoxysilane, γ-glycidoxypropyl trimethoxysilane and γ-mercaptopropyl trimethoxysilane. Example of the titanate coupling agent includes isopropyl triisostearoyl titanate. Example of the aluminate coupling agent includes acetoalkoxyaluminum diisopropylate.

The graphite (e4) selected as the thermally conductive filler (e) is not particularly limited so far as it belongs to the category of graphite. Graphite is roughly classified into a natural graphite and a artificial graphite. The natural graphite includes earthy graphite, squamous graphite and scale-like graphite, and any of those may be used. The fixed carbon content in the graphite (e4) is not particularly limited. Graphite having a fixed carbon content of 95% or more is preferable for the reason that a polyarylene sulfide composition having particularly excellent thermal conductivity is obtained. Particle diameter of the graphite (e4) is not particularly limited. The graphite having an average particle diameter in primary particles of from 0.5 to 400 μm is preferable for the reason that a polyarylene sulfide composition having particularly excellent thermal conductivity is obtained.

Further, the polyarylene sulfide composition of the present invention can be used by mixing at least one of various thermosetting resins and thermoplastic resins, such as an epoxy resin, a cyanic ester resin, a phenolic resin, a polyimide, a silicon resin, a polyolefin, a polyester, a polyamide, a polyphenylene oxide, a polycarbonate, a polysulfone, a polyether imide, a polyether sulfone, polyether ketone and a polyetherether ketone in a range that the present invention does not deviate from its object.

As a production method of the polyarylene sulfide composition of the present invention, the conventional heat melt kneading method can be used. Examples of the production method include heat melt kneading methods by a single-screw or twin-screw extruder, a kneader, a mill, a brabender or the like. In particular, a melt kneading method by a twin-screw extruder having excellent kneading ability is preferable. Kneading temperature in this case is not particularly limited, and can optionally be selected in a range of generally from 280 to 400° C. The polyarylene sulfide composition of the present invention can be molded into an optional shape using an injection molding machine, an extrusion molding machine, a transfer molding machine, a compression molding machine or the like.

The polyarylene sulfide composition of the present invention can contain a non-fibrous reinforcement in a range that the present invention does not deviate from its object. Examples of the non-fibrous reinforcement include calcium carbonate, mica, silica, talc, calcium sulfate, kaolin, clay, whallastenite, zeolite, glass beads and glass powder. Those reinforcements can be used as mixtures of two or more thereof, and if necessary, can be used by surface treating those with a silane coupling agent or a titanium coupling agent. More preferable non-fibrous reinforcements are calcium carbonate and talc.

The polyarylene sulfide composition of the present invention may further contain at least one conventional additive such as lubricants, heat stabilizers, antioxidants, ultraviolet absorbers, crystal nucleating agents, foaming agents, mold corrosion preventives, flame retardants, flame retardant aids, coloring materials such as a dye and a pigment, and antistatic agents in a range that the present invention does not deviate from its object.

The polyarylene sulfide composition of the present invention is particularly suitable to an encapsulating resin of semiconductor elements, resistors and the like having exothermic properties, and parts generating high friction heat, and additionally is particularly suitable to applications in electric instrument parts such as an electric generator, an electric motor, a voltage transformer, a current transformer, a voltage regulator, a rectifier, an inverter, an electric relay, an electric power contact, a switch, a circuit breaker, a knife switch, an other pole rod, an electric part cabinet, a socket, a resistor and a relay case. Further, the polyarylene sulfide composition of the present invention can be applied to various applications such as electronic parts represented by a sensor, a LED lamp, a connector, a small switch, a coil bobbin, a capacitor, a variable capacitor case, an optical pickup, an oscillator, various terminal plates, a transformer, a plug, a printing substrate, a tuner, a speaker, a microphone, a headphone, a small motor, a magnetic head base, a power module, a semiconductor, a liquid crystal, an FDD carriage, an FDD chassis, a hard disc drive part (such as a hard disc drive hub, an actuator and a hard disc substrate), a DVD part (such as an optical pickup), a motor brush holder, a satellite dish, and computer-related parts; home and office electric appliances represented by a VTR part, a television part, an iron, a hair drier, a rice cooker part, a microwave oven part, an acoustic part, audio instrument parts such as an audio and/or laser disc (registered trade mark) and/or a compact disc, a lighting part, a refrigerator part, an air conditioner part, a typewriter part and a word processor part; machinery-related parts represented by office computer-related parts, telephone equipment-related parts, facsimile-related parts, copying machine-related parts, a washing jig, a motor part, a writer and a typewriter; optical instrument- and precision instrument-related parts represented by a microscope, binoculars, a camera and a watch; and automobile- and vehicle-related parts such as an alternator terminal, an alternator connector, an IC regulator, a potentiometer base for light deer, various valves such as an exhaust gas valve, various fuel-related and/or exhaust and/or exhalation pipes, an air intake nozzle snorkel, an intake manifold, a fuel pump, an engine cooling water joint, a carburetor main body, a carburetor spacer, an exhaust gas sensor, a cooling water sensor, an oil temperature sensor, a brake pad wear sensor, a throttle position sensor, a crank shaft position sensor, an air flow meter, a brake pad abrasion sensor, a thermostat base for air conditioner, a heating hot air flow control valve, a brush holder for radiator motor, a water pump impeller, a turbine vane, wiper motor-related parts, a distributor, a starter switch, a starter relay, a transmission wire harness, a window washer nozzle, a air conditioner panel switch substrate, a coil for fuel-related electromagnetic valve, a fuse connector, a horn terminal, an electrical part insulating plate, a step motor rotor, a lamp socket, a lamp reflector, a lamp housing, a break piston, a solenoid bobbin, an engine oil filter and an igniter case.

The present invention is described by following Examples and Comparative Examples, but the invention is not limited by those examples in any way.

In the Examples and the Comparative Examples, the following materials were used as a polyarylene sulfide (a), a metal silicon powder (b), a fibrous filler (c), a release agent (d), a thermally conductive filler (e) and other filler (f).

<Polyarylene Sulfide (a)>

Poly(p-phenylene sulfide) (a-1) (hereinafter simply referred to as PPS (a-1)): Melt viscosity 110 poise Poly(p-phenylene sulfide) (a-2) (hereinafter simply referred to as PPS (a-2)): Melt viscosity 300 poise Poly(p-phenylene sulfide) (a-3) (hereinafter simply referred to as PPS (a-3)): Melt viscosity 350 poise <Metal Silicon Powder (b)>

Metal silicon powder (b-1): Metal Silicon #200 (98%), trade name, a product of Kinsei Matec Co., Ltd.; silicon content 98.4 wt %; average particle diameter 17 μm; amorphous powder Metal silicon powder (b-2): Metal Silicon #600, trade name, a product of Kinsei Matec Co., Ltd.; silicon content wt %; average particle diameter 6 μm; amorphous powder Metal silicon powder (b-3): Metal Silicon #200 (95%), trade name, a product of Kinsei Matec Co., Ltd.; silicon content 95.6 wt %; average particle diameter 16 μm; amorphous powder <Fibrous Filler (c)>

Carbon fiber (c1-1) having a coefficient of thermal conductivity of 100 W/m·K or more (hereinafter simply referred to as high thermally conductive carbon fiber (c1-1): DIALEAD K6371T, trade name, a product of Mitsubishi Chemical Functional Products, Inc.; coefficient of thermal conductivity 140 W/m·K, chopped fiber, fiber diameter 10 μm, fiber length 6 mm Glass fiber (c2-1): RES03-TP91, trade name, a product of NSG Vetrotex K.K.; chopped fiber, fiber diameter 9 μm, fiber length 3 mm <Release Agent (d)>

Carnauba wax (d1-1): Purified Carnauba #1 Powder, trade name, a product of Nikko Fine Products Co.

<Thermally Conductive Filler (e)>

Scale-like boron nitride powder (e1-1) having a hexagonal structure (hereinafter simply referred to as a "scale-like boron nitride powder (e1-1)"): Denka Boron Nitride SGP, trade name, a product of Denki Kagaku Kogyo K.K., average particle diameter 18.0 μm, specific surface area 2 m$^2$/g, G.I. value 0.9

Scale-like boron nitride powder (e1-2) having a hexagonal structure (hereinafter simply referred to as a "scale-like boron nitride powder (e1-2)"): Denka Boron Nitride SP-2, trade name, a product of Denki Kagaku Kogyo K.K., average particle diameter 4.0 μm, specific surface area 34 m$^2$/g, G.I. value 7.5

Coated magnesium oxide powder (e2-1) coated with forsterite (hereinafter simply referred to as a "coated magnesium oxide powder (e2-1)"): Cool Filler CF2-100, trade name, a product of Tateho Chemical Industries Co., Ltd., surface coated with forsterite, average particle diameter 20 μm High purity magnesite powder (e3-1): Synthetic Magnesite MSHP, trade name, a product of Konoshima Chemical Co., Ltd., magnesium carbonate content 99.99 wt %, average particle diameter 12 μm High purity magnesite powder (e3-2): Synthetic Magnesite MSL, trade name, a product of Konoshima Chemical Co., Ltd., magnesium carbonate content 99.7 wt %, average particle diameter 8 μm Graphite (e4-1): UFG-30, trade name, artificial graphite, a product of Showa Denko K.K., fixed carbon content 99.4

<Other Filler (f)>

Magnesium oxide powder (f-1) which is not coated with a complex oxide (hereinafter simply referred to as a "magnesium oxide powder (f-1)"): PYROKISUMA 3320, trade name, a product of Kyowa Chemical Industry Co., Ltd., average particle diameter 17 μm Magnesite powder (f-2): Heavy Magnesium Carbonate, trade name, a product of Konoshima Chemical Co., Ltd., magnesium carbonate content 86.8 wt %, average particle diameter 11 μm Evaluation and/or measurement methods used in the Examples and Comparative Examples are described below.

~Measurement of Flexural Strength~

A test piece having a length of 127 mm, a width of 12.7 mm and a thickness of 3.2 mm was prepared by injection molding, and using the test piece, flexural strength was measured according to ASTM D-790, Method-1 (three-point flexural method). The measurement was conducted using a measurement device (AG-5000B, trade name, a product of Shimadzu Corporation) and under the test conditions of a distance between supports 50 mm and measuring speed 1.5 mm/min.

~Measurement of Coefficient of Thermal Conductivity~

Measured with a laser flash method under the condition of 23° C. using a measurement device of coefficient of thermal conductivity (TC7000; ruby laser, trade name, a product of ULVAC, Inc.). Coefficient of thermal conductivity in thickness direction was calculated by the following equation after heat capacity Cp and thermal diffusivity α in thickness direction were obtained by a one-dimensional method, and coefficient of thermal conductivity in a plane direction was calculated by the following equation after thermal diffusivity α' in a plane direction was obtained by a two-dimensional method.

Coefficient of thermal conductivity in thickness direction=ρ×Cp×α

Coefficient of thermal conductivity in plane direction=ρ×Cp×α'

Here, the density ρ was measured according to ASTM D-792 Method A (water substitution method). The test piece to be subjected to measurement was processed by cutting from a flat plate used in the following linear expansion coefficient. Further, to evaluate anisotropy of the coefficient of thermal conductivity, (thickness direction)/(plane direction) ratio of coefficient of thermal conductivity was calculated. It was judged that anisotropy is small as the value approaches 100%, and reversely, where the value is close to 0% or greatly exceeds 100%, the anisotropy is large.

~Measurement of Linear Expansion Coefficient~

A flat plate having a length of 70 mm, a width of 70 mm and a thickness of 2 mm was prepared by injection molding. A strip plate having a width of 5 mm and a length of 15 mm in a flow direction (MD) of a resin and a direction (TD) vertical to the flow direction of a resin, respectively was cut from the flat plate, and this was used as a test piece for the measurement of a linear expansion coefficient. The test piece was placed on a measuring device (DL7000, trade name, a product of ULVAC, Inc.), and a linear expansion coefficient was measured under a temperature-rising condition of 2° C./min in a range of from 30 to 200° C. Further, to evaluate anisotropy of the liner expansion coefficient, (MD)/(TD) ratio of a linear expansion coefficient was calculated. It was judged that anisotropy is small as the value approaches 100%, and reversely, where the value is close to 0% or greatly exceeds 100%, the anisotropy is large.

~Measurement of Melt Flow Rate (MFR)~

Using a Koka type flow tester, weight (unit: g) of a composition which flows out for 10 minutes under the conditions of a temperature of 315° C., a load of 5 kg and a die inner diameter of 2.0 mm was measured, and this was designated melt flow rate (hereinafter referred to as "MFR").

SYNTHESIS EXAMPLE 1

Synthesis of PPS (a-1) and PPS (a-2)

1,866 g of $Na_2S \cdot 2.8H_2O$ and 5 liters of N-methyl-2-pyrrolidone (hereinafter referred to as "NMP") were charged in 15 liters autoclave equipped with a stirrer, and temperature was gradually elevated to 205° C. under nitrogen stream while stirring to distillate 407 g of water. This system was cooled to 140° C., and 2,280 g of p-dichlorobenzene and 1,500 g of NMP were added to the system. The system was sealed under nitrogen stream. The system was elevated to 225° C., and polymerization was conducted at 225° C. for 2 hours. After completion of the polymerization, the system was cooled to room temperature, and a polymer was isolated by a centrifuge. The polymer was washed with hot water repeatedly, and dried at 100° C. day and night to obtain a poly(p-phenylene sulfide).

Melt viscosity of the poly(p-phenylene sulfide) (PPS (a-1)) obtained was 110 poise.

Further, PPS (a-1) was subjected to heat curing treatment at 235° C. in an air atmosphere. Melt viscosity of a poly(p-phenylene sulfide) (PPS (a-2)) obtained was 300 poise.

SYNTHESIS EXAMPLE 2

(Synthesis of PPS (a-3))

3,232 g of NMP, 1,682 g of 47% sodium hydrogensulfide aqueous solution and 1,142 g of 48% sodium hydroxide aqueous solution were charged in 15 liters titanium-made autoclave equipped with a stirrer, and temperature was gradually elevated to 200° C. under nitrogen stream while stirring to distillate 1,360 g of water. The system was cooled to 170° C., and 2,118 g of p-dichlorobenzene and 1,783 g of NMP were added to the system. The system was sealed under nitrogen stream. The system was elevated to 225° C., and polymerization was conducted at 225° C. for 1 hour. Continuously, temperature was elevated to 250° C. and polymerization was conducted at 250° C. for 2 hours. 451 g of water was injected at 250° C., temperature was elevated to 255° C., and polymerization was conducted at 255° C. for 2 hours. After completion of the polymerization, the system was cooled to room temperature, and a polymer slurry was subjected to solid-liquid separation. The polymer was washed with NMP, acetone and water successively, and dried at 100° C. day and night to obtain a poly(p-phenylene sulfide).

The poly(p-phenylene sulfide) (PPS (a-3)) obtained was a linear polymer, and its melt viscosity was 350 poise.

EXAMPLE 1

46.2 wt % of PPS (a-2) and 53.8 wt % of a metal silicon powder (b-1) were blended, and introduced into a hopper of a twin-screw extruder (TEM-35-102B, trade name, a product of Toshiba Machine Co., Ltd.) heated to 310° C. On the other hand, a high thermally conductive carbon fiber (c1-1) was introduced into a hopper of a side feeder of the twin-screw extruder. Those were melt kneaded at screw revolutions of 200 rpm. A molten composition flown out of a die was cooled and then cut to prepare polyarylene sulfide composition pellets. Constitution of the polyarylene sulfide composition in this case was PPS (a-2)/metal silicon powder (b-1)/high thermally conductive carbon fiber (c1-1)=30/35/35 (wt %).

The polyarylene sulfide composition was introduced into a hopper of an injection molding machine (SE75S, trade name, a product of Sumitomo Heavy Industries, Ltd.) heated to 310° C., and a test piece for measuring flexural strength, and flat plates for measuring coefficient of thermal conductivity and linear expansion coefficient were molded, respectively.

Flexural strength, coefficient of thermal conductivity and linear expansion coefficient were measured from the test piece and the flat plates. Further, the polyarylene sulfide composition was charged in a Koka type flow tester to measure MFR. Those results are shown in Table 1.

The polyarylene sulfide composition obtained had sufficiently large flexural strength and high coefficient of thermal conductivity with its small anisotropy. Further, the linear expansion coefficient was small, and its anisotropy was small. Additionally, MFR showed a practically sufficient value.

EXAMPLES 2 TO 15

Using PPS (a-1, 2 and 3), metal silicon powders (b-1, 2 and 3), a high thermally conductive carbon fiber (c1-1), a glass fiber (c2-1), carnauba wax (d1-1), scale-like boron nitride powders (e1-1 and 2), a coated magnesium oxide powder (e2-1), high purity magnesite powders (e3-1 and 2) and graphite (e4-1), polyarylene sulfide compositions having constitutional proportions shown in Tables 1 and 2 and test pieces for evaluation were prepared in the same manner as in Example 1, and evaluated. The evaluation results are shown in Tables 1 and 2.

All the polyarylene sulfide compositions obtained had high coefficient of thermal conductivity and small linear expansion coefficient. Further, the compositions having the thermally conductive filler (e) contained therein obtained in Examples 8 to 15 were that both the (thickness direction)/(plane direction) ratio of the coefficient of thermal conductivity and the (MD)/(TD) ratio of the linear expansion coefficient exceed 90%, and thus, the anisotropy of both the coefficient of thermal conductivity and the linear expansion coefficient were small and excellent.

TABLE 1

| | | Unit | Example 1 | Example 2 | Example 3 | Example 4 | Example 5 | Example 6 | Example 7 |
|---|---|---|---|---|---|---|---|---|---|
| Formulation | Polyarylene sulfide (a) | wt % | | | | | | | |
| | PPS (a-1) | | | | | | | | |
| | PPS (a-2) | | 30 | 30 | | | 29 | 29 | 29 |
| | PPS (a-3) | | | | 29 | 29 | | | |
| | Metal silicon powder (b) | | | | | | | | |
| | Metal silicon powder (b-1) | | 35 | 55 | | | 35 | | |
| | Metal silicon powder (b-2) | | | | 35 | | | 35 | |
| | Metal silicon powder (b-3) | | | | | 35 | | | 35 |
| | Fibrous filler (c) | | | | | | | | |
| | High thermally conductive carbon fiber (c1-1) | | 35 | | 35 | 35 | 35 | 35 | 35 |
| | Glass fiber (c2-1) | | | 15 | | | | | |
| | Release agent (d) | | | | | | | | |
| | Carnauba wax (d1-1) | | | | 1 | 1 | 1 | 1 | 1 |
| | Thermally conductive filler (e) | | | | | | | | |
| | Scale-like boron nitride powder (e1-1) | | | | | | | | |
| | Scale-like boron nitride powder (e1-2) | | | | | | | | |
| | Coated magnesium oxide powder (e2-1) | | | | | | | | |
| | High purity magnesite powder (e3-1) | | | | | | | | |
| | High purity magnesite powder (e3-2) | | | | | | | | |
| | Graphite (e4-1) | | | | | | | | |
| | Total | | 100 | 100 | 100 | 100 | 100 | 100 | 100 |
| Flexural strength | | MPa | 130 | 148 | 127 | 126 | 130 | 127 | 127 |
| Coefficient of thermal conductivity | | | | | | | | | |
| (Thickness direction) | | W/m·K | 5.1 | 3.3 | 4.7 | 4.4 | 5.1 | 4.7 | 3.9 |
| (Plane direction) | | | 5.7 | 3.7 | 5.3 | 5.0 | 5.6 | 5.3 | 4.3 |
| (Thickness direction)/(Plane direction) ratio | | % | 89 | 89 | 89 | 88 | 91 | 89 | 91 |
| Linear expansion coefficient (MD) | | ×10⁻⁵/°C. | 1.8 | 1.9 | 1.9 | 1.9 | 1.8 | 1.9 | 1.9 |
| (TD) | | | 2.2 | 2.4 | 2.3 | 2.3 | 2.2 | 2.3 | 2.3 |
| (MD)/(TD) ratio | | % | 82 | 79 | 83 | 83 | 82 | 83 | 83 |
| MFR | | g/10 min | 78 | 94 | 69 | 70 | 78 | 69 | 77 |

TABLE 2

| | | Unit | Example 8 | Example 9 | Example 10 | Example 11 | Example 12 | Example 13 | Example 14 | Example 15 |
|---|---|---|---|---|---|---|---|---|---|---|
| Formulation | Polyarylene sulfide (a) | wt % | | | | | | | | |
| | PPS (a-1) | | 24 | 24 | 24 | 24 | 24 | | 15 | 15 |
| | PPS (a-2) | | | | | | | | | |
| | PPS (a-3) | | | | | | | 34 | | |
| | Metal silicon powder (b) | | | | | | | | | |
| | Metal silicon powder (b-1) | | 40 | 40 | | | | 35 | | |
| | Metal silicon powder (b-2) | | | | 15 | 15 | 15 | | 40 | 40 |
| | Metal silicon powder (b-3) | | | | | | | | | |
| | Fibrous filler (c) | | | | | | | | | |
| | High thermally conductive carbon fiber (c1-1) | | 25 | 25 | 25 | 25 | 25 | 20 | 23 | |
| | Glass fiber (c2-1) | | | | | | | | | 23 |

TABLE 2-continued

|  | Unit | Example 8 | Example 9 | Example 10 | Example 11 | Example 12 | Example 13 | Example 14 | Example 15 |
|---|---|---|---|---|---|---|---|---|---|
| Release agent (d) |  |  |  |  |  |  |  |  |  |
| Carnauba wax (d1-1) |  | 1 | 1 | 1 | 1 | 1 | 1 | 2 | 2 |
| Thermally conductive filler (e) |  |  |  |  |  |  |  |  |  |
| Scale-like boron nitride powder (e1-1) |  | 10 |  |  |  |  |  |  | 20 |
| Scale-like boron nitride powder (e1-2) |  |  | 10 |  |  |  |  |  |  |
| Coated magnesium oxide powder (e2-1) |  |  |  | 35 |  |  |  |  |  |
| High purity magnesite powder (e3-1) |  |  |  |  | 35 |  |  |  |  |
| High purity magnesite powder (e3-2) |  |  |  |  |  | 35 |  |  |  |
| Graphite (e4-1) |  |  |  |  |  |  | 10 | 20 |  |
| Total |  | 100 | 100 | 100 | 100 | 100 | 100 | 100 | 100 |
| Flexural strength | MPa | 122 | 124 | 116 | 136 | 144 | 141 | 122 | 138 |
| Coefficient of thermal conductivity |  |  |  |  |  |  |  |  |  |
| (Thickness direction) | W/m·K | 5.4 | 4.9 | 4.3 | 4.0 | 3.7 | 4.2 | 5.6 | 3.8 |
| (Plane direction) |  | 5.7 | 5.2 | 4.7 | 4.2 | 3.8 | 4.6 | 6.0 | 4.1 |
| (Thickness direction)/(Plane direction) ratio | % | 95 | 94 | 91 | 95 | 97 | 91 | 93 | 93 |
| Linear expansion coefficient (MD) | $\times 10^{-5}/°C$ | 2.2 | 2.3 | 2.0 | 2.3 | 2.3 | 2.0 | 2.1 | 1.8 |
| (TD) |  | 2.4 | 2.5 | 2.2 | 2.5 | 2.5 | 2.2 | 2.3 | 2.0 |
| (MD)/(TD) ratio | % | 92 | 92 | 91 | 92 | 92 | 91 | 91 | 90 |
| MFR | g/10 min | 66 | 68 | 76 | 80 | 85 | 62 | 60 | 71 |

COMPARATIVE EXAMPLES 1 TO 10

Using PPS (a-1 and 2), a metal silicon powder (b-1), a high thermally conductive carbon fiber (c1-1), a glass fiber (c2-1), carnauba wax (d1-1), a scale-like boron nitride powder (e1-1), a coated magnesium oxide powder (e2-1), graphite (e4-1), a magnesium oxide powder (f-1) and a magnesite powder (f-2), polyarylene sulfide compositions having constitutional proportions shown in Table 3 and test pieces for evaluation were prepared in the same manner as in Example 1, and evaluated. The evaluation results are shown in Table 3.

The composition which does not contain the fibrous filler (c), obtained in Comparative Example 1, the composition which does not contain the metal silicon powder (b), obtained in Comparative Example 2, the composition which contains the thermally conductive filler (e) but does not contain the metal silicon powder (b) and the fibrous filler (c), obtained in Comparative Example 3, the compositions which contain the other filler (f) but do not contain the fibrous filler (c), obtained in Comparative Examples 4 and 5, the compositions which contain the other filler (f) but do not contain the metal silicon powder (b), obtained in Comparative Examples 6 and 7, the compositions which contain the thermally conductive filler (e) but do not contain the metal silicon powder (b), obtained in Comparative Examples 8 and 9, and the composition which contains the thermally conductive filler (e) but does not contain the fibrous filler (c), obtained in Comparative Example 10 all had low coefficient of thermal conductivity, and further anisotropy in both the coefficient of thermal conductivity and the linear expansion coefficient was large. Further, in the system which does not contain the fibrous filler (c), the flexural strength was low.

TABLE 3

|  |  | Unit | Comparative Example 1 | Comparative Example 2 | Comparative Example 3 | Comparative Example 4 | Comparative Example 5 |
|---|---|---|---|---|---|---|---|
| Formulation | Polyarylene sulfide (a) | wt % |  |  |  |  |  |
|  | PPS (a-1) |  |  |  |  |  |  |
|  | PPS (a-2) |  | 30 | 35 | 24 | 24 | 25 |
|  | Metal silicon powder (b) |  |  |  |  |  |  |
|  | Metal silicon powder (b-1) |  | 70 |  |  | 40 | 40 |
|  | Fibrous filler (c) |  |  |  |  |  |  |
|  | High thermally conductive carbon fiber (c1-1) |  |  | 65 |  |  |  |
|  | Glass filler (c2-1) |  |  |  |  |  |  |
|  | Release agent (d) |  |  |  |  |  |  |
|  | Carnauba wax (d1-1) |  |  |  |  | 1 | 1 | 1 |
|  | Thermally conductive filler (e) |  |  |  |  |  |  |
|  | Scale-like boron nitride powder (e1-1) |  |  |  | 15 |  |  |
|  | Coated magnesium oxide powder (e2-1) |  |  |  | 60 |  |  |

TABLE 3-continued

| | | | | | | |
|---|---|---|---|---|---|---|
| Graphite (e4-1) | | | | | | |
| Other filler (f) | | | | | | |
| Magnesium oxide powder (f-1) | | | | | 35 | |
| Magnesite powder (f-2) | | | | | | 34 |
| Total | | 100 | 100 | 100 | 100 | 100 |
| Flexural strength | MPa | 49 | 140 | 57 | 70 | 77 |
| Coefficient of thermal conductivity | | | | | | |
| (Thickness direction) | W/m·K | 0.7 | 0.8 | 1.7 | 1.0 | 0.8 |
| (Plane direction) | | 2.9 | 1.9 | 2.8 | 2.2 | 1.6 |
| (Thickness direction)/(Plane direction) ratio | % | 24 | 42 | 61 | 45 | 50 |
| Linear expansion coefficient (MD) | $\times 10^{-5}/°C$ | 3.1 | 1.4 | 2.8 | 2.7 | 2.9 |
| (TD) | | 4.0 | 2.9 | 3.8 | 3.4 | 3.7 |
| (MD)/(TD) ratio | % | 78 | 48 | 74 | 79 | 78 |
| MFR | g/10 min | 44 | 107 | 85 | 96 | 101 |

| | | Unit | Comparative Example 6 | Comparative Example 7 | Comparative Example 8 | Comparative Example 9 | Comparative Example 10 |
|---|---|---|---|---|---|---|---|
| Formulation | Polyarylene sulfide (a) | wt % | | | | | |
| | PPS (a-1) | | | | 28 | 24 | 18 |
| | PPS (a-2) | | 24 | 25 | | | |
| | Metal silicon powder (b) | | | | | | |
| | Metal silicon powder (b-1) | | | | | | 30 |
| | Fibrous filler (c) | | | | | | |
| | High thermally conductive carbon fiber (c1-1) | | 40 | 40 | | 25 | |
| | Glass filler (c2-1) | | | | 25 | | |
| | Release agent (d) | | | | | | |
| | Carnauba wax (d1-1) | | 1 | 1 | 2 | 1 | 2 |
| | Thermally conductive filler (e) | | | | | | |
| | Scale-like boron nitride powder (e1-1) | | | | | 10 | 10 |
| | Coated magnesium oxide powder (e2-1) | | | | | 40 | 40 |
| | Graphite (e4-1) | | | | 45 | | |
| | Other filler (f) | | | | | | |
| | Magnesium oxide powder (f-1) | | 35 | | | | |
| | Magnesite powder (f-2) | | | 34 | | | |
| Total | | | 100 | 100 | 100 | 100 | 100 |
| Flexural strength | | MPa | 132 | 138 | 151 | 119 | 119 |
| Coefficient of thermal conductivity | | | | | | | |
| (Thickness direction) | | W/m·K | 0.9 | 0.8 | 1.2 | 2.1 | 1.4 |
| (Plane direction) | | | 1.7 | 1.6 | 1.6 | 3.4 | 2.2 |
| (Thickness direction)/(Plane direction) ratio | | % | 53 | 50 | 75 | 62 | 64 |
| Linear expansion coefficient (MD) | | $\times 10^{-5}/°C$ | 2.0 | 2.0 | 1.7 | 2.6 | 2.6 |
| (TD) | | | 3.0 | 3.1 | 2.8 | 3.3 | 3.5 |
| (MD)/(TD) ratio | | % | 67 | 65 | 61 | 79 | 74 |
| MFR | | g/10 min | 88 | 94 | 31 | 68 | 58 |

While the invention has been described in detail and with reference to specific embodiments thereof, it will be apparent to one skilled in the art that various changes and modifications can be made therein without departing from the spirit and scope thereof.

This application is based on Japanese Patent Application (Patent Application No. 2005-320716) filed Nov. 4, 2005 and Japanese Patent Application (Patent Application No. 2006-105219) filed Apr. 6, 2006, the entire contents thereof being hereby incorporated by reference.

INDUSTRIAL APPLICABILITY

The present invention provides a polyarylene sulfide composition having excellent thermal conductivity, dimensional stability, heat resistance and low gas property, and the polyarylene sulfide composition is particularly useful to applications of electric parts such as electric and/or electronic parts or automobile electric parts. The industrial value of the present invention is remarkable.

The invention claimed is:

1. A polyarylene sulfide composition comprising from 15 to 50% by weight of a polyarylene sulfide (a), from 15 to 60% by weight of a metal silicon powder (b) having a silicon content of 95% by weight or more and an average particle diameter of 1 μm or more and from 5 to 60% by weight of carbon fiber (c1) having a coefficient of thermal conductivity of 100 W/m·K or more, having a flexural strength of from 116 to 144 MPa according to ASTM D-790 Method 1, a coefficient of thermal conductivity in a thickness direction of from 3.7 to 5.6 W/m·K, and a coefficient of thermal conductivity in a plane direction of from 3.8 to 6.0 W/m·K.

2. The polyarylene sulfide composition as claimed in claim 1, further comprising at least one thermally conductive filler (e) selected from the group consisting of a scale-like boron nitride powder (e1) having a hexagonal structure, a coated magnesium oxide powder (e2) coated with a complex oxide of silicon and magnesium and/or a complex oxide of aluminum and magnesium, a high purity magnesite powder (e3) which is a magnesite comprising magnesium carbonate as a main component and has a magnesium carbonate content of from 98 to 99.999% by weight, and graphite (e4).

3. The polyarylene sulfide composition as claimed in claim 1, comprising the polyarylene sulfide (a), the metal silicon powder (b), a carbon fiber (c1) having a coefficient of thermal conductivity of 100 W/m·K (or more, carnauba wax (d1) and at least one thermally conductive filler (e) selected from the group consisting of a scale-like boron nitride powder (e1) having a hexagonal structure, a coated magnesium oxide powder (e2) coated with a complex oxide of silicon and magnesium and/or a complex oxide of aluminum and magnesium, a high purity magnesite powder (e3) which is a magnesite comprising magnesium carbonate as a main component and has a magnesium carbonate content of from 98 to 99.999% by weight, and graphite (e4).

4. The polyarylene sulfide composition as claimed in claim 1, wherein the silicon powder has an average particle diameter of 6 μm or more.

5. The polyarylene sulfide composition as claimed in claim 1, wherein the silicon powder has an average particle diameter of 16 μm or more.

6. The polyarylene sulfide composition as claimed in claim 1, comprising a polyarylene sulfide polymer comprising 90 mol % or more of p-phenylene sulfide repeating units.

7. The polyarylene sulfide composition as claimed in claim 1, comprising the polyphenylene sulfide in an amount of from 15 to 40 wt %, the metal silicon powder in an amount of from 15 to 40% by weight, and the carbon fiber in an amount of from 20 to 35% by weight.

8. The polyarylene sulfide composition as claimed in claim 1, wherein the polyarylene sulfide composition does not contain any glass fiber and has a flexural strength of from 116-144 MPa.

9. The polyarylene sulfide composition as claimed in claim 1, wherein a ratio of a coefficient of thermal conductivity in a thickness direction: a coefficient of thermal conductivity in the plane direction is from 88 to 97%.

10. The polyarylene sulfide composition as claimed in claim 1, further comprising a release agent (d).

11. The polyarylene sulfide composition as claimed in claim 10, wherein the release agent (d) is carnauba wax (d1).

12. The polyarylene sulfide composition as claimed in claim 1, wherein the silicon powder has an average particle diameter of 6-17μm.

13. The polyarylene sulfide composition as claimed in claim 12, wherein the silicon has a silicon content of from 95.6 to 98.4 wt %.

14. A polyarylene sulfide composition, comprising:
from 15 to 40 wt % of polyphenylene sulfide,
from 15 to 40% by weight of metal silicon powder having a silicon content of 95% by weight or more and an average diameter of 1 μm or more, and
from 20 to 35% by weight of carbon fiber having a coefficient of thermal conductivity of 100 W/m·K or more,
wherein % by weight is based on the total weight of the composition;
wherein the polyarylene sulfide composition has a flexural strength of from 116 to 144 MPa, a coefficient of thermal conductivity in a thickness direction of from 3.7 to 5.6W/m·K, and a coefficient of thermal conductivity in the plane direction of from 3.8 to 6.0W/m·K.

15. The polyarylene sulfide composition as claimed in claim 14, comprising from 15 to 34 wt % of polyphenylene sulfide.

16. The polyarylene sulfide composition as claimed in claim 14, wherein the composition does not contain any glass fiber.

17. The polyarylene sulfide composition as claimed in claim 14, further comprising boron nitride powder in an amount of from 10 to 20% by weight.

18. The polyarylene sulfide composition as claimed in claim 14, further comprising graphite in an amount of 10 to 20% by weight.

* * * * *